(12) United States Patent
Abuomar et al.

(10) Patent No.: US 10,353,887 B1
(45) Date of Patent: Jul. 16, 2019

(54) CONCURRENT RECORD UPDATING WITH MITIGATION OF CONTENTION

(71) Applicant: Amazon Technologies, Inc., Seattle, WA (US)

(72) Inventors: Mohammad Haroon Mohammad Abuomar, Redwood, WA (US); Gustavo Adolfo Plancarte Ibarra, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 584 days.

(21) Appl. No.: 15/080,528

(22) Filed: Mar. 24, 2016

(51) Int. Cl.
G06F 16/22 (2019.01)
G06F 16/23 (2019.01)

(52) U.S. Cl.
CPC ...... G06F 16/2315 (2019.01); G06F 16/2228 (2019.01)

(58) Field of Classification Search
CPC ......... G06F 17/30351; G06F 17/30321; G06F 17/30595
USPC .......................................................... 707/609
See application file for complete search history.

(56) References Cited

U.S. PATENT DOCUMENTS

| | | | |
|---|---|---|---|
| 5,870,752 A * | 2/1999 | Gibbons | G06F 16/2358 |
| 7,010,163 B1 * | 3/2006 | Weiss | G06T 5/20 382/168 |
| 7,444,349 B1 | 10/2008 | Ochotta | |
| 7,941,616 B2 | 5/2011 | Rajamani et al. | |
| 8,301,847 B2 | 10/2012 | Dantzig et al. | |
| 8,539,567 B1 * | 9/2013 | Logue | H04L 63/0884 726/7 |
| 9,122,713 B2 | 9/2015 | Okamoto | |
| 9,158,746 B2 | 10/2015 | Ootorii | |
| 9,244,961 B2 | 1/2016 | Vermette | |
| 2015/0106407 A1 * | 4/2015 | Adayilamuriyil | G06F 17/30595 707/804 |

* cited by examiner

*Primary Examiner* — Cam Linh T Nguyen
(74) *Attorney, Agent, or Firm* — Robert C. Kowert; Meyertons, Hood, Kivlin, Kowert & Goetzel, P.C.

(57) ABSTRACT

Methods, systems, and computer-readable media for concurrent record updating with mitigation of contention are disclosed. A record containing a numerical value is divided into a plurality of buckets. The buckets contain portions of the numerical value. A selected bucket of the plurality of buckets is randomly determined for a request to update the numerical value. A portion of the numerical value in the selected bucket is updated based at least in part on the request. Access to the selected bucket is granted using optimistic concurrency or pessimistic concurrency.

20 Claims, 10 Drawing Sheets

CONCURRENT RECORD UPDATING WITH MITIGATION OF CONTENTION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers.

Web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogs of items offered for sale. For each item offered for sale, such electronic catalogs typically include at least one product detail page (e.g., a web page) that specifies various information about the item, such as a description of the item, one or more pictures of the item, as well as specifications (e.g., weight, dimensions, capabilities) of the item. In various cases, such network-based marketplaces may rely on a service-oriented architecture to implement various business processes and other tasks. The service-oriented architecture may be implemented using a distributed system that includes many different computing resources and many different services that interact with one another, e.g., to generate a product detail page or process an order placed by a consumer for one or more items in the catalog.

Figure 1:
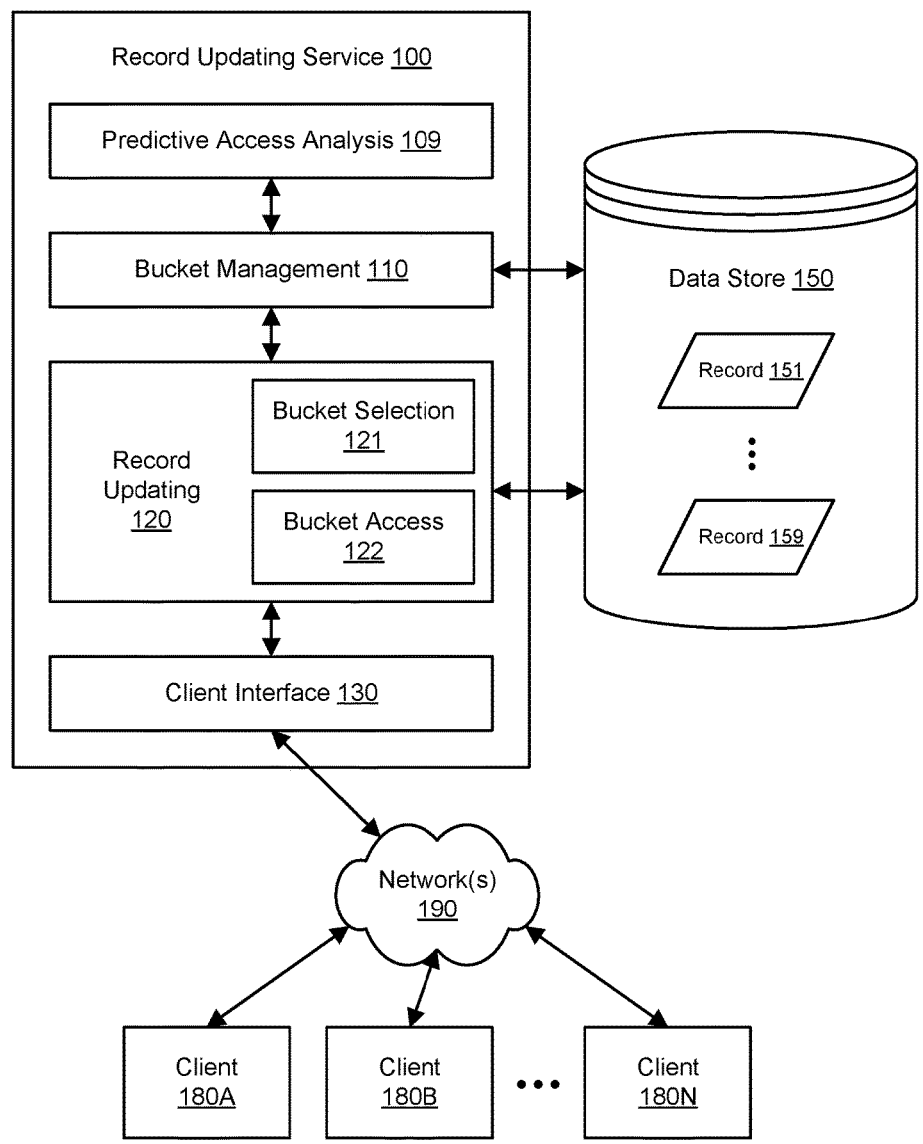
FIG. 1 illustrates an example system environment for concurrent record updating with mitigation of contention, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for concurrent record updating with mitigation of contention are described. Using the techniques described herein, records such as counts of items in an electronic catalog may be updated efficiently in a manner that mitigates or reduces the occurrence of contention on the records. An optimistic concurrency technique may be used to access records such that locks are not acquired when accessing the records, but a transaction is only committed if the data has not been modified by another transaction since being read. Contention may include concurrent attempts to access the same record, e.g., by multiple threads or processes to attempt to update the contents of the record. For example, when two orders are placed for the same item in an internet-accessible marketplace, two threads or processes may attempt to access the same record to decrement the count of inventory for the item; if the two attempts are close enough in time, one of them may fail and keep retrying until it can access and successfully update the record. To mitigate such contention, the contents of a main record may be split into a set of sub-records referred to herein as buckets. The record may contain a numerical value such as a count in a merchant's inventory, and the buckets may contain portions of that numerical value. When a request to update the record is received, one of the buckets is selected for processing of the request, e.g., on a random basis, and the portion of the value in that bucket is increased or decreased instead of the value in the main record. The quantity of buckets associated with a record may be based initially on a system-wide configuration value that may be determined based on analysis of contention or other access metrics for a set of records. The quantity of buckets may be dynamically increased or decreased for a particular record based on analysis of contention on that record. In this manner, concurrent access to a record may be increased.

FIG. 1 illustrates an example system environment for concurrent record updating with mitigation of contention, according to one embodiment. A record updating service 100 may be offered to one or more clients 180A-180N. Although three clients 180A, 180B, and 180N are shown for purposes of illustration and example, it is contemplated that any suitable number and configuration of clients may interact with the service 100. The clients 180A-180N may represent any suitable software and/or hardware components, such as other services in a service-oriented system (e.g., a system that includes a plurality of services that interact with one another in a service-oriented architecture). The computing devices 180A-180N may be coupled to the service 100 via one or more networks 190. The record updating service 100 may be offered to the clients 180A-180N using any suitable interface(s), such as one or more application programming interfaces (APIs), as implemented in a client interface 130. The record updating service 100 may be managed by or otherwise associated with an electronic marketplace that offers various goods and services (collectively referred to herein as "items") to customers, e.g., over the Internet. The clients 180A-180N may typically be managed by the same entity that manages the electronic marketplace but may also represent external clients.

The record updating service 100 may manage at least a portion of a data store 150 that stores records 151-159. Although two records 151 and 159 are shown for purposes of illustration and example, it is contemplated that any suitable number and configuration of records may be maintained in the data store 150. The data store 150 may be internal or external to the service 100 and may be implemented using any suitable techniques or subsystems, such as a noSQL storage service. Each of the records 151-159 may contain one or more values, including numerical values. For example, a particular record may contain a count that represents the quantity of an item in the inventory of a merchant such as an internet-accessible electronic marketplace. The clients 180A-180N may send requests to the record updating service 100 to decrement or increment the count associated with a particular item in the inventory, e.g., when orders from customers for that item are placed or returned. Contention may occur due to concurrent attempts to access the same record, e.g., by multiple threads or processes to attempt to update the contents of the record on behalf of different requests. For example, when two orders are placed for the same item in a marketplace, two threads or processes may attempt to access the same record to decrement the count of inventory for the item; if the two attempts are close enough in time, one of them may fail and keep retrying until it can access and successfully update the record.

As will be discussed in greater detail below, the record updating service 100 may permit contents of records 151-159 or data associated with the records to be updated efficiently in a manner that mitigates or reduces the occurrence of contention on the records. The record updating service 100 may include a functionality for bucket management 110. Using the bucket management functionality 110, a record may be divided into multiple buckets. The record may contain a numerical value such as a count in a merchant's inventory, and the buckets may contain portions of that numerical value. The contents of the buckets may be updated instead of the record itself to increase the number of concurrent updates that can be performed successfully (and thereby decrease contention on records). The bucket management functionality 110 may implement bucket creation, bucket replenishment, and/or bucket reclamation such that the quantity of buckets for a particular record is properly tuned for mitigation of contention.

The buckets 151-159 may be created and maintained in the data store 150 using similar techniques as those used to create and maintain records, e.g., upon request from the service 100. If the main record is associated with a primary key in the data store 150 (where the primary key uniquely identifies the record within a relevant context), then the buckets may be assigned identifiers that are derived from or otherwise based (at least in part) on the primary key. For example, a bucket associated with a record may be assigned a key that includes the primary key for the record plus a seed value or another additional value specific to that bucket, where the resulting key uniquely identifies the bucket within a relevant context in the data store 150 and also represents the association between the bucket and the main record.

The record updating service 100 may include a functionality for record updating 120. The record updating functionality 120 may include a bucket selection functionality 121 and a functionality for bucket access 122. When a request to update a record is received, one of the buckets associated with that record may be selected for processing of the request using the bucket selection functionality 121. A bucket may be selected from the set of buckets associated with a record on a random basis (potentially including pseudo-random techniques). Using the functionality for bucket access 122, an optimistic concurrency technique may be used to access a record or bucket such that locks are not acquired, but a transaction is only committed if the data has not been modified by another transaction since being read. If the request is successfully performed on a bucket, then the portion of the value in that bucket is updated (e.g., increased or decreased) instead of the value in the main record. In one embodiment, the bucket access 122 may alternatively use a pessimistic concurrency technique in which a lock is acquired when updating a record; the use of buckets as described herein may increase the throughput for updates made using pessimistic concurrency.

Various sources of input may be used for the bucket management 110. In one embodiment, the record updating 120 itself may be used as a source of input for the bucket management 110. For example, the frequency of access to a particular record or the rate of contention and/or optimistic concurrency failures for a particular record may be used to drive bucket management, e.g., to increase or decrease the quantity of buckets associated with the record. In one embodiment, predictive access analysis 109 may be used as a source of input for the bucket management 110. The predictive access analysis 109 may seek to anticipate or predict the quantity of buckets to be used for a particular record. In one embodiment, the predictive access analysis 109 may seek to anticipate or predict the quantity of buckets to be used for a particular record over a particular window of time such as a sale or other period of unusually high or low popularity. The predictive access analysis 109 may use input from an administrator and/or input from automated analysis of access patterns for one or more records, e.g., to learn when a particular record is typically subject to a high or low rate of access.

The clients 180A-180N may encompass any type of client configurable to submit requests to the service 100. For example, a given client may include one or more services. As another example, a given client may include a plug-in module or other type of code module configured to execute as an extension to or within an execution environment provided by a web browser. In one embodiment, a client may encompass an application such as a database application (or user interface thereof), a media application, an office application, or any other application that may make use of virtual compute instances, storage volumes, or other network-based services to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, clients 180A-180N may be configured to generate network-based service requests according to a Representational State Transfer (REST)-style network-based services architecture, a document- or message-based network-based services architecture, or another suitable network-based services architecture. In at least some embodiments, clients 180A-180N and/or computing devices that implement the record updating service 100 may provision, mount, and configure storage volumes implemented at storage services for file systems implemented at the corresponding computing devices.

Clients 180A-180N may convey network-based service requests to the service 100 via network(s) 190. In various embodiments, network(s) 190 may encompass any suitable combination of networking hardware and protocols necessary to establish network-based communications between clients 180A-180N and the service 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given client and the service 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given client and the Internet as well as between the Internet and the service 100. It is noted that in some embodiments, any of clients 180A-180N may communicate with service 100 using a private network rather than the public Internet.

Figure 8:
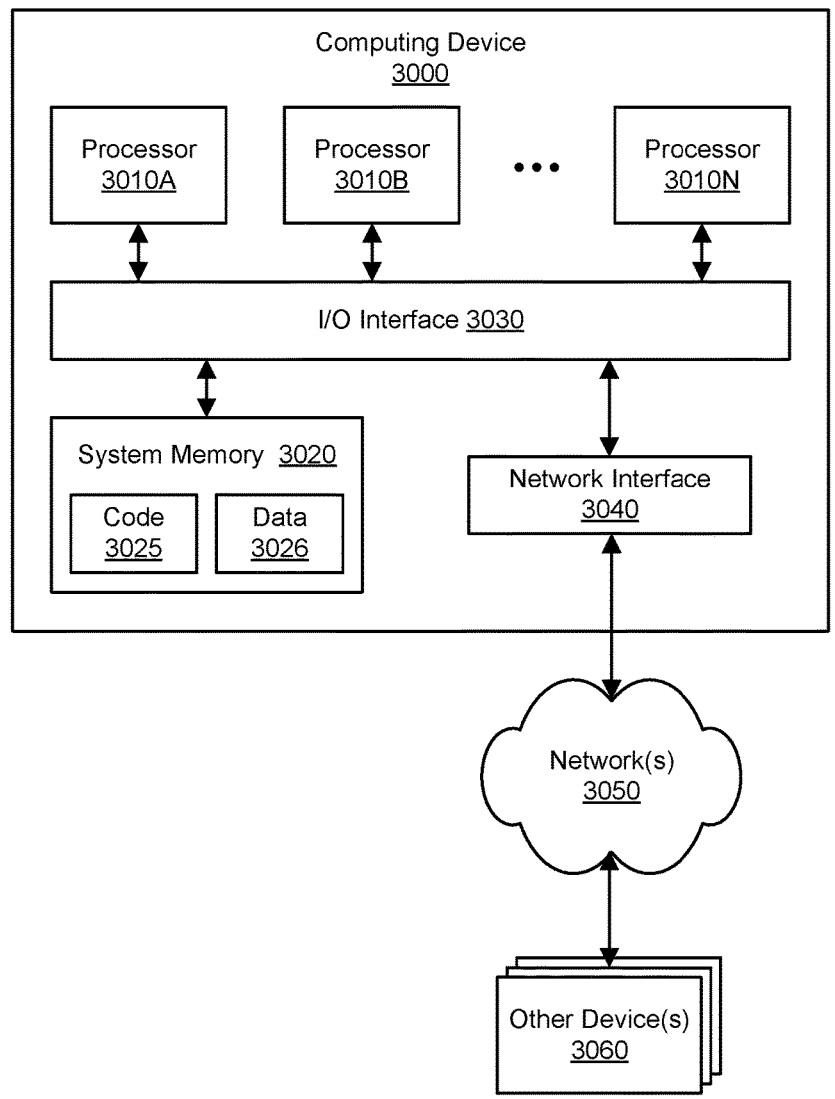
FIG. 8 illustrates an example computing device that may be used in some embodiments.

The record updating service 100 may include one or more computing devices, any of which may be implemented by the example computing device 3000 illustrated in FIG. 8. Similarly, any of the clients 180A-180N may be implemented using the example computing device 3000 illustrated in FIG. 8. In various embodiments, portions of the described functionality of the service 100, data store 150, and/or clients 180A-180N may be provided by the same computing device or by any suitable number of different computing devices. If any of the components are implemented using different computing devices, then the components and their respective computing devices may be communicatively coupled, e.g., via a network. Each of the illustrated components (such as the record updating service 100 and its constituent functionalities) may represent any combination of software and hardware usable to perform their respective functions. It is contemplated that the service 100 and/or data store 150 may include additional components not shown, fewer components than shown, or different combinations, configurations, or quantities of the components shown.

Figure 2A:
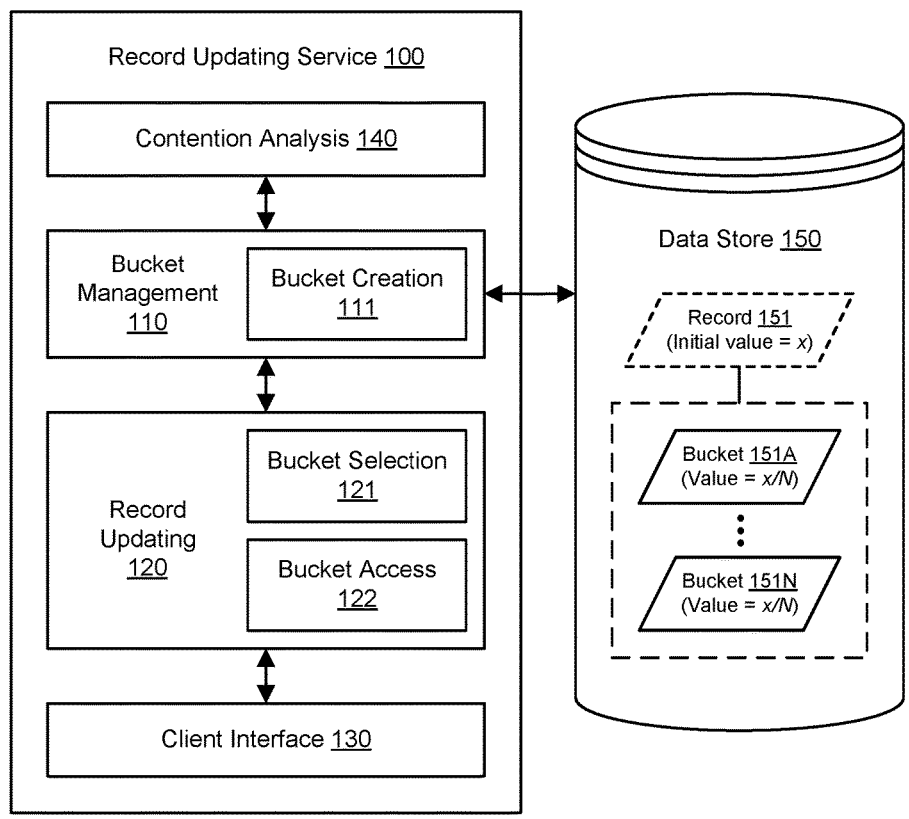
FIG. 2A illustrates further aspects of the example system environment for concurrent record updating with mitigation of contention, including dividing a record evenly into buckets, according to one embodiment.

FIG. 2A illustrates further aspects of the example system environment for concurrent record updating with mitigation of contention, including dividing a record evenly into buckets, according to one embodiment. A bucket creation functionality 111 may be used to generate buckets associated with a record within the data store 150. As shown in the example of FIG. 2A, N buckets 151A-151N may be created for a particular record 151. The buckets 151A-151N may be created by the data store 150 upon receiving suitable requests or commands from the bucket creation functionality 111, or the bucket creation functionality may have sufficient access to the data store to write the buckets directly to storage in the data store. As discussed above, each of the buckets 151A-151N associated with the record 151 may contain a portion of the contents of the record. If the main record contains a numerical value x such as an inventory count for an item, then individual buckets associated with that record may be assigned portions or fractions of that numerical value x. In one embodiment, the numerical value x may be divided as evenly as possible into the N buckets such that individual buckets may (on average) contain x/N. For example, a record 151 containing a value of 100 may be divided as evenly as possible into N buckets 151A-151N, such that if 100 is divisible by N, then each of the buckets may contain a value of 100/N. In one embodiment, the probability of contention using the N buckets may be divided by N in comparison to the non-bucket technique.

The quantity N of the buckets 151A-151N created for the particular record 151 may be determined on any suitable basis. In one embodiment, the initial quantity of buckets for a particular record may be based (at least in part) on a system-wide configuration value. The system-wide configuration value may be derived from contention analysis 140 or other access analysis for updates to a plurality of records throughout the system. The system-wide configuration value may be determined such that the rate of contention is minimized for most types of records based on historical access patterns such as a number of average concurrent requests for records. For example, if most records tend to experience an average of three concurrent update requests, then the system-wide configuration value may represent three buckets for each record. The system-wide configuration value may not eliminate the possibility of contention on a record but may instead mitigate and limit its occurrence.

The quantity N of buckets 151A-151N for a particular record 151 may also be dynamically tuned based on contention analysis 140 or other access analysis for that record. For example, the number of buckets may be increased if excessive contention is observed, or the number of buckets may be decreased if few of the buckets are subject to concurrent updates. The number of buckets may also be preemptively increased or decreased based on administrator input, e.g., if a product is expected to be more or less popular with customers over a particular window of time. In one embodiment, updates may initially be performed on the main record, and the division of the record into the buckets may be performed based (at least in part) on a detection of contention on the record.

Figure 2B:
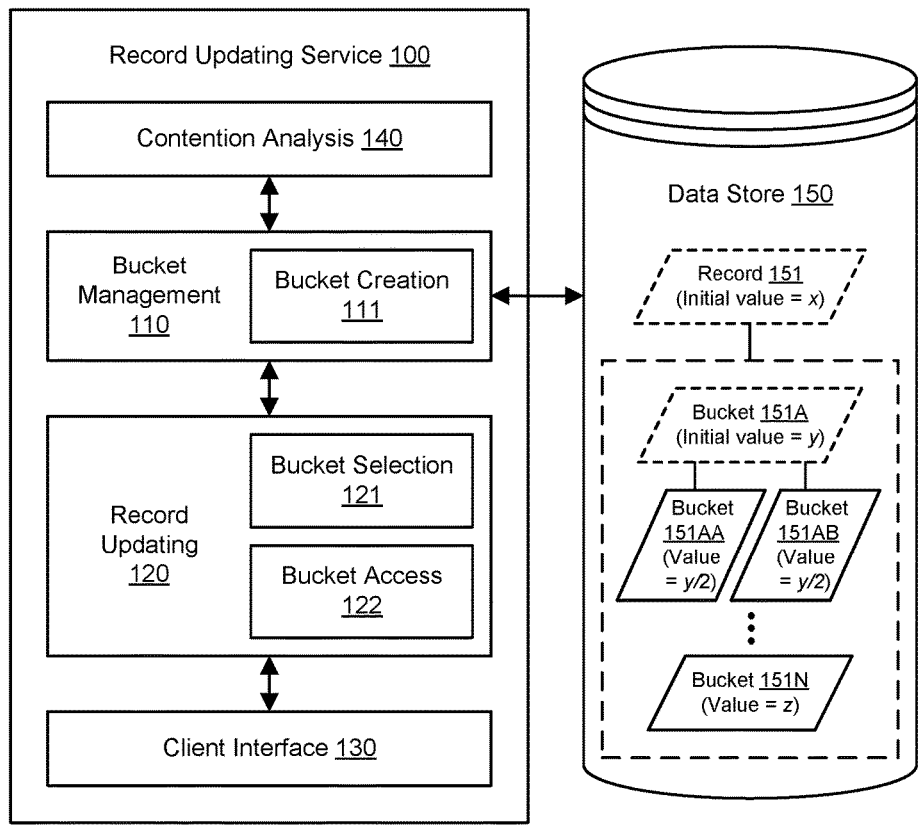
FIG. 2B illustrates further aspects of the example system environment for concurrent record updating with mitigation of contention, including dividing a bucket evenly into additional buckets, according to one embodiment.

FIG. 2B illustrates further aspects of the example system environment for concurrent record updating with mitigation of contention, including dividing a bucket evenly into additional buckets, according to one embodiment. In the example of FIG. 2B, the bucket management functionality 110 has determined that the quantity of buckets for the record 151 should be increased. For example, contention analysis 140 or other access metrics may have determined that the rate of contention for the buckets associated with the record 151 is above an acceptable threshold. In one embodiment, the bucket management functionality 110 may cause one of the buckets, such as bucket 151A, to be divided into two new buckets, such as buckets 151AA and 151AB. The bucket 151A may be chosen for a split on any suitable basis, e.g., if its value y is greater than a value z of another bucket 151N for the same record 151. Although bucket 151A is shown as being divided into two new buckets for purposes of illustration and example, a given bucket may be divided into any suitable number of new buckets. If the bucket 151A contains a value y at the time of the division, then portions of that value y may be assigned to the new buckets 151AA and 151AB. In one embodiment, the numerical value y may be divided as evenly as possible into the two new buckets such that individual buckets may (on average) contain y/2. For example, if y is divisible by 2, then each of the buckets may contain a value of y/2. In one embodiment, as shown in the example of FIG. 2B, the bucket 151A may be left with a value of zero and may be eliminated. In one embodiment, however, the bucket 151A may be left with a portion of the value y that was not distributed to the new buckets.

Figure 3A:
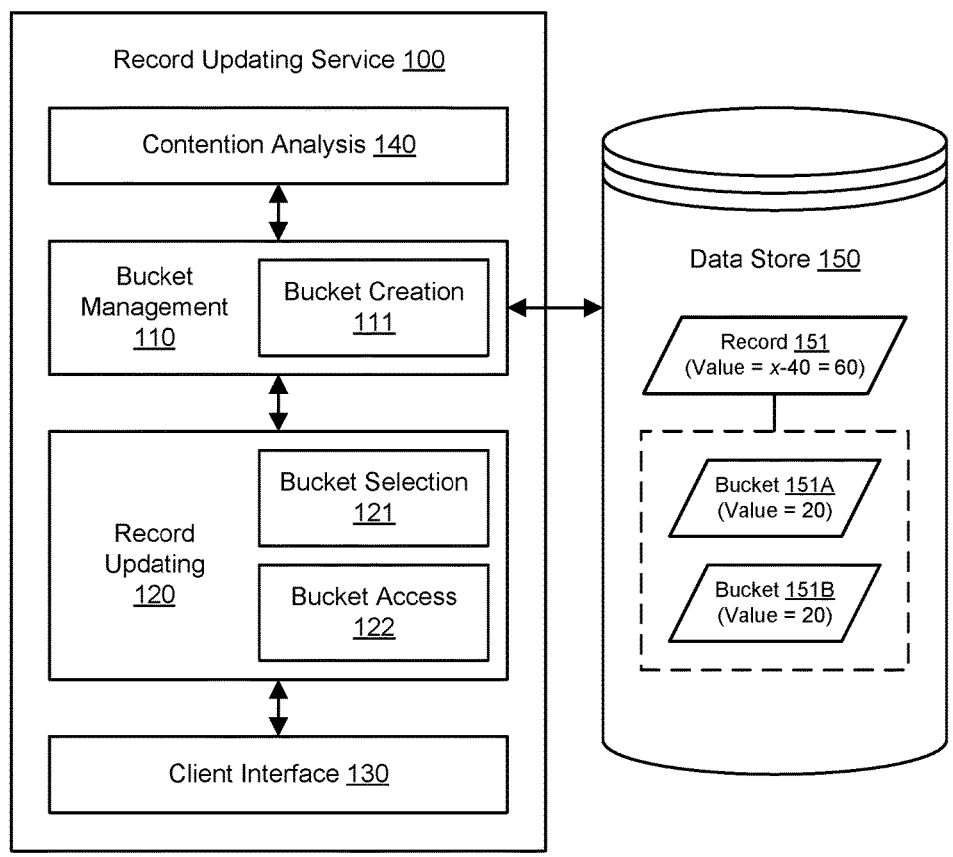
FIG. 3A illustrates further aspects of the example system environment for concurrent record updating with mitigation of contention, including provisioning values from a record into buckets, according to one embodiment.

FIG. 3A illustrates further aspects of the example system environment for concurrent record updating with mitigation of contention, including provisioning values from a record into buckets, according to one embodiment. A bucket creation functionality 111 may be used to generate buckets associated with a record within the data store 150. As shown in the example of FIG. 3A, two buckets 151A and 151B may be created for a particular record 151. However, it is contemplated that any suitable number of buckets may be created for the record 151, e.g., as based on a system-wide configuration value and/or based on contention analysis 140. The buckets 151A-151B may be created by the data store 150 upon receiving suitable requests or commands from the bucket creation functionality 111, or the bucket creation functionality may have sufficient access to the data store to write the buckets directly to storage in the data store. As discussed above, each of the buckets 151A-151B associated with the record 151 may contain a portion of the contents of the record. If the main record contains a numerical value x such as an inventory count for an item, then individual buckets associated with that record may be assigned portions or fractions of that numerical value x. In one embodiment, portions of a total count x in the main record may be provisioned to the buckets while potentially leaving part of the count in the main record. For example, one bucket 151A containing a value of 20 and another bucket 151B containing a value of 20 may be provisioned from a main record 151 that initially contains a value x of 100, thereby leaving a value of 60 in the main record. In this manner, the main record may contain a reservoir of inventory to be used for additional buckets or for replenishing the contents of the buckets 151A-151B. As discussed above, the quantity of buckets associated with the record 151 may be dynamically tuned, e.g., based on a detection of contention.

Figure 3B:
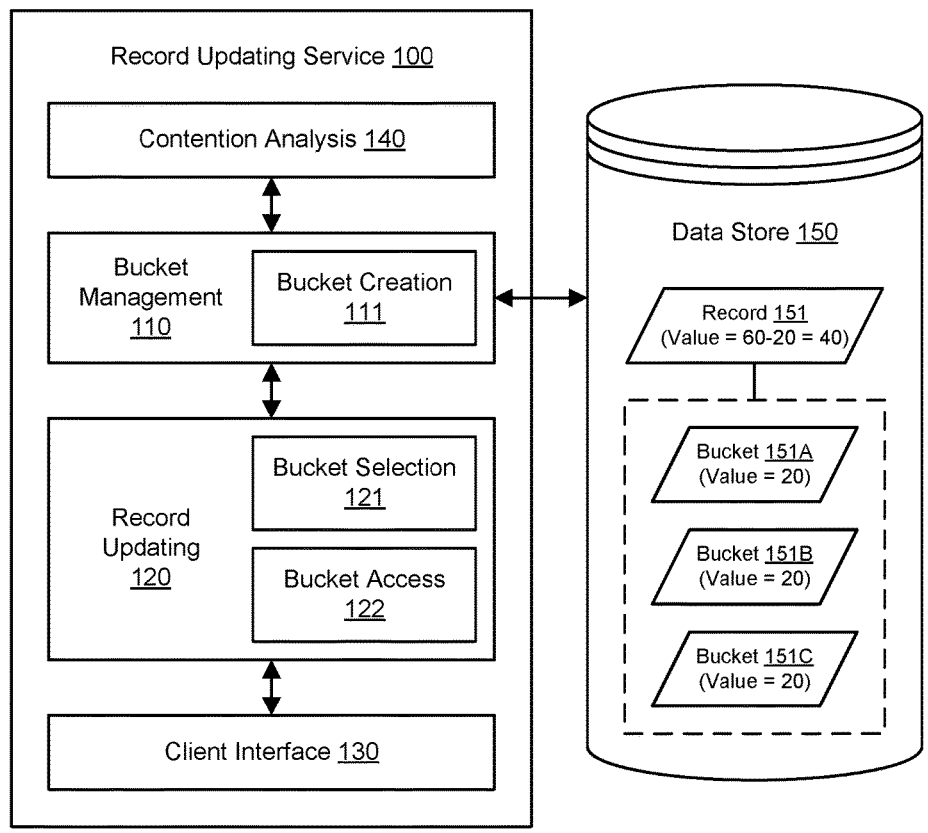
FIG. 3B illustrates further aspects of the example system environment for concurrent record updating with mitigation of contention, including provisioning a value from a remaining portion of a record into an additional bucket, according to one embodiment.

FIG. 3B illustrates further aspects of the example system environment for concurrent record updating with mitigation of contention, including provisioning a value from a remaining portion of a record into an additional bucket, according to one embodiment. In the example of FIG. 3B, the bucket management functionality 110 has determined that the quantity of buckets for the record 151 should be increased. For example, contention analysis 140 or other access metrics may have determined that the rate of contention for the buckets associated with the record 151 is above an acceptable threshold. In one embodiment, the bucket management functionality 110 may cause an additional bucket 151C to be added to the set of buckets for the record 151. A portion of a count in the main record 151 may be provisioned to the new bucket 151C while potentially leaving part of the count in the main record. For example, a value of 20 may be provisioned to the new bucket 151C from the main record at a time when the record has a count of 60, thereby leaving a value of 40 in the main record. In this manner, the quantity of buckets may be tuned while reducing the fragmentation shown in FIG. 2B.

Figure 4:
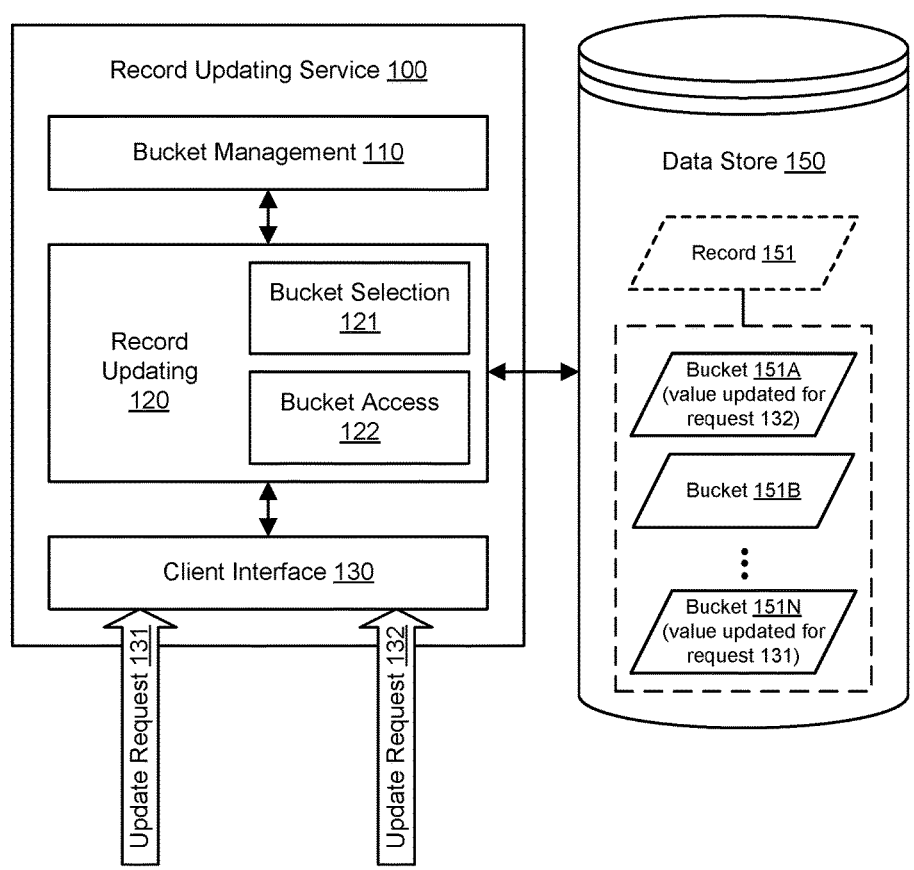
FIG. 4 illustrates further aspects of the example system environment for concurrent record updating with mitigation of contention, including concurrently updating multiple buckets associated with the same record, according to one embodiment.

FIG. 4 illustrates further aspects of the example system environment for concurrent record updating with mitigation of contention, including concurrently updating multiple buckets associated with the same record, according to one embodiment. Multiple requests 131 and 132 to update the same record 151 may be received by the record updating service 100 over a relatively short window of time. The update requests 131 and 132 may be received from one or more of the client 180A-180N. If the record 151 represents a count of an item in an inventory, then the requests 131 and 132 may seek to increase or decrease the count (e.g., as a result of customer activity or merchant restocking). The requests 131 and 132 may include data or metadata (e.g., an item identifier) that is usable to identify the main record 151, and the request may also indicate the desired change to the contents of the record (e.g., an increase or decrease of a specified magnitude in a numerical value).

Using the bucket selection functionality 121, one of the buckets 151A-151N may be randomly selected for processing the request 131, and one of the buckets 151A-151N may also be randomly selected for processing the request 132. As used herein, the terms "random" and "randomly" also encompass pseudo-random techniques. As shown in the example of FIG. 4, bucket 151N may first be selected for the request 131, and the update associated with that request may be committed to that bucket using the bucket access functionality 122. In one embodiment, bucket access 122 may involve optimistic concurrency control that uses a conditional write or a compare-and-swap operation to ensure that the value has not been altered by another request before the current update is committed. Ultimately, as also shown in the example of FIG. 4, bucket 151A may be selected for the request 132. However, it is possible that bucket 151N may initially be selected for the request 132, and an attempt to commit the request 132 may fail if the other request 131 is committed to bucket 151N after the contents of the bucket 151N have been read for processing the request 132. In such a scenario, a different bucket 151A may be randomly selected for the request 132. However, the use of multiple buckets 151A-151N for the record 151 is expected to reduce such occurrences of contention.

In one embodiment, the record 151 may contain data other than a numerical value, such as an alphanumeric product description or other complex data structure rather than an inventory count. In one embodiment, more complex contents of a record may be split into buckets for mitigation of contention. For example, different subsets of alphanumeric product description data may be assigned to different buckets. Each of the resulting buckets may be associated with a particular content type, e.g., each bucket may contain one or more categories of product description data, such as a title, summary, weight, dimensions, and so on. When requests to update the product description data are received, appropriate buckets may be selected based on an association between the request and the one or more categories of product description data in the selected bucket. The bucket selection functionality 121 may maintain a mapping of categories or content types to buckets and may analyze incoming requests (e.g., the contents of the requests) to determine the categories or content types that they seek to update.

Figure 5:
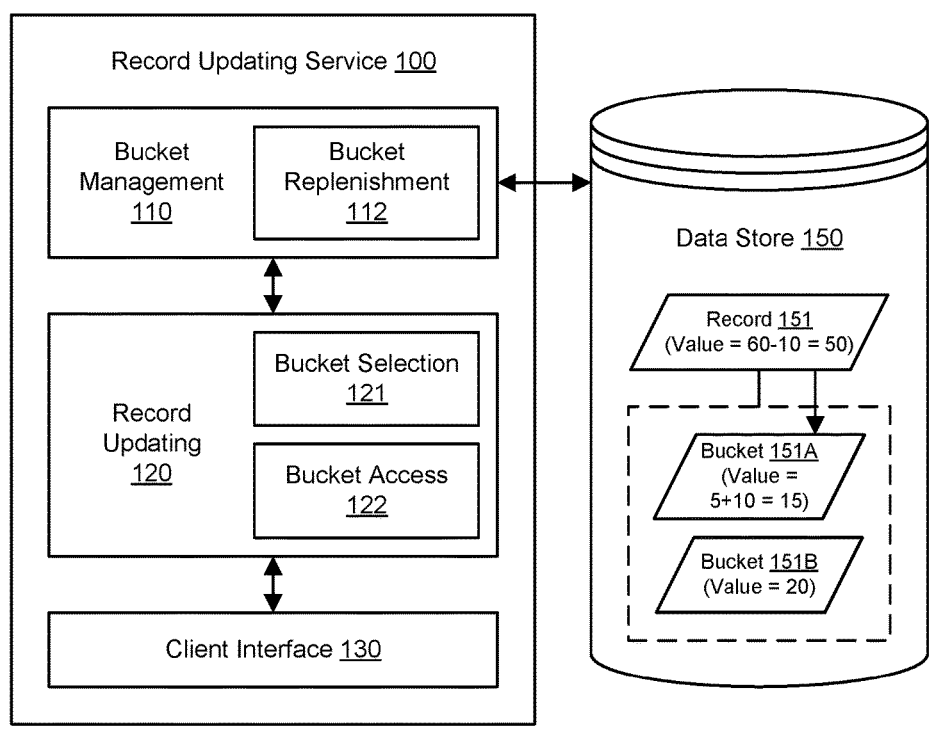
FIG. 5 illustrates further aspects of the example system environment for concurrent record updating with mitigation of contention, including replenishing the value in a bucket, according to one embodiment.

FIG. 5 illustrates further aspects of the example system environment for concurrent record updating with mitigation of contention, including replenishing the value in a bucket, according to one embodiment. In one embodiment, additional techniques for bucket management 110 may be used, including bucket replenishment 112. If the portion of the value in a particular bucket has dropped below a threshold value (e.g., has dropped close to zero), then that portion may be increased. The bucket may be replenished using a value provisioned from the main record or transferred from one or more other buckets. As shown in the example of FIG. 5, a value of 10 may be provisioned to the bucket 151A from the main record 151 at a time when the record has a count of 60, thereby leaving a value of 50 in the main record. If a value of 5 was already in the bucket 151A, then the new value of the bucket is 15 after the replenishment.

Figure 6:
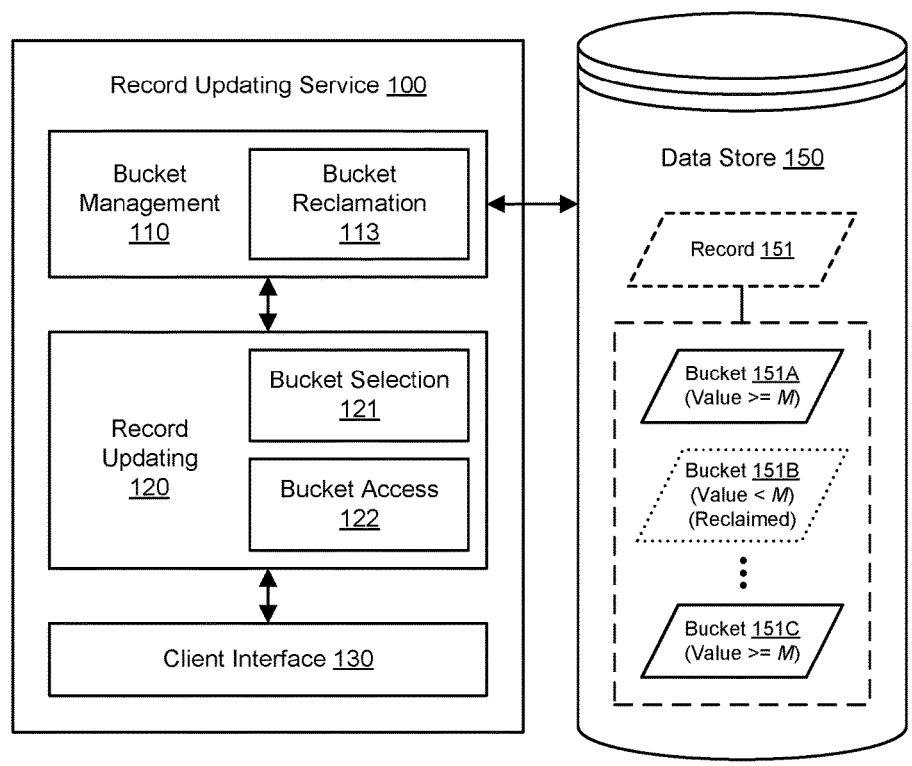
FIG. 6 illustrates further aspects of the example system environment for concurrent record updating with mitigation of contention, including reclaiming a bucket whose value has dropped below a threshold, according to one embodiment.

FIG. 6 illustrates further aspects of the example system environment for concurrent record updating with mitigation of contention, including reclaiming a bucket whose value has dropped below a threshold, according to one embodiment. In one embodiment, additional techniques for bucket management 110 may be used, including bucket reclamation 113. If the portion of the value in a particular bucket has dropped below a threshold value (e.g., has dropped close to zero), then that bucket may be reclaimed and eliminated from the set of buckets. As shown in the example of FIG. 6, the value of bucket 151B may be less than a predetermined threshold value M, while the respective values of buckets 151A and 151N may be greater than or equal to M. Accordingly, the bucket 151B may be reclaimed and eliminated. If the portion of the value in the particular bucket 151B is greater than zero, then the portion of the value may be moved from the particular bucket to the main record or to one or more other buckets. If access to a record and its buckets slows sufficiently, then bucket reclamation may be repeated until only the main record remains with no buckets being used.

Figure 7:
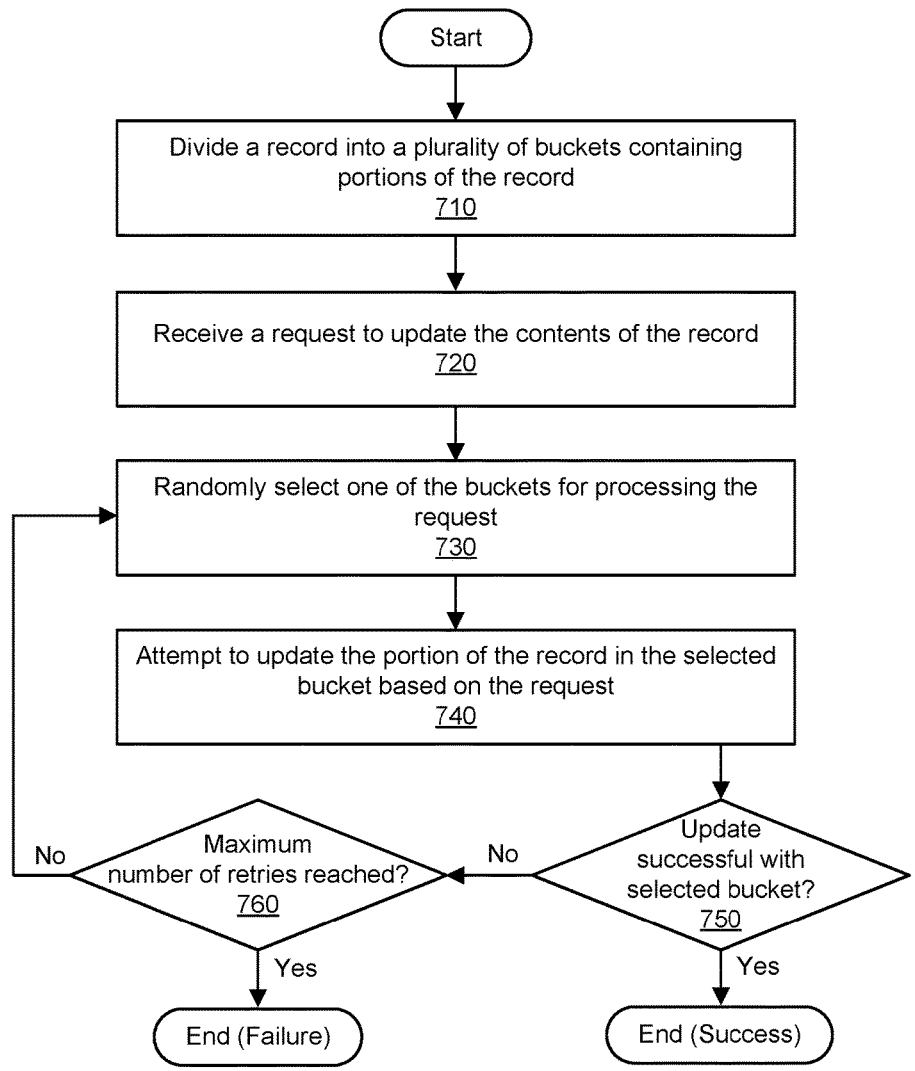
FIG. 7 is a flowchart illustrating a method for concurrent record updating with mitigation of contention, according to one embodiment.

FIG. 7 is a flowchart illustrating a method for concurrent record updating with mitigation of contention, according to one embodiment. In various embodiments, any of the operations shown in FIG. 7 may be performed (at least in part) or initiated by a record updating service. The record updating service may be offered to one or more clients using any suitable interface(s), such as one or more application programming interfaces (APIs). The record updating service may manage at least a portion of a data store that stores records; the data store may be internal or external to the service. Each of the records may contain one or more values, including numerical values. For example, a particular record may contain a count that represents the quantity of an item in the inventory of a merchant such as an internet-accessible marketplace. The record updating service may be accessed by clients such as other services that seek to decrement or increment the count associated with a particular item in the inventory, e.g., when orders from customers for that item are placed or returned. Contention may include concurrent attempts to access the same record, e.g., by multiple threads or processes to attempt to update the contents of the record. For example, when two orders are placed for the same item in an internet-accessible marketplace, two threads or processes may attempt to access the same record to decrement the count of inventory for the item; if the two attempts are close enough in time, one of them may fail and keep retrying until it can access and successfully update the record.

As shown in 710, a record (also referred to herein as the main record) may be divided into a plurality of sub-records referred to as buckets. The division of the record into the buckets may be performed to mitigate contention. In one embodiment, each of the resulting buckets may contain a portion of the contents of the main record. If the main record contains a numerical value such as an inventory count for an item, then individual buckets associated with that record may be assigned portions of that numerical value. In one embodiment, the numerical value may be divided as evenly as possible into the buckets. For example, a record containing a value of 100 may be divided as evenly as possible into N buckets, such that if 100 is divisible by N, then each of the buckets may contain a value of 100/N. In one embodiment, portions of a total count in the main record may be provisioned to the buckets while potentially leaving part of the count in the main record. For example, one bucket containing a value of 20 and another bucket containing a value of 20 may be provisioned from a main record that initially contains a value of 100, thereby leaving a value of 60 in the main record.

The quantity of the buckets created for a particular record may be determined on any suitable basis. In one embodiment, the initial quantity of buckets for a particular record may be based (at least in part) on a system-wide configuration value. The system-wide configuration value may be derived from contention analysis or other access analysis for updates to a plurality of records throughout the system. The system-wide configuration value may be determined such that the rate of contention is minimized for most types of records based on historical access patterns such as a number of average concurrent requests for records. For example, if most records tend to experience a peak of three concurrent update requests, then the system-wide configuration value may represent three buckets for each record. The system-wide configuration value may not eliminate the possibility of contention on a record but may instead mitigate and limit its occurrence. The quantity of buckets for a particular record may also be dynamically tuned based on contention analysis or other access analysis for that record. For example, the number of buckets may be increased if excessive contention is observed, or the number of buckets may be decreased if few of the buckets are subject to concurrent updates. The number of buckets may also be increased or decreased based on administrator input, e.g., if a product is expected to be more or less popular with customers over a particular window of time. In one embodiment, updates may initially be performed on the main record, and the division of the record into the buckets may be performed based (at least in part) on a detection of contention on the record.

In various embodiments, additional techniques for bucket management may be used, including bucket replenishment and/or bucket reclamation. If the portion of the value in a particular bucket has dropped below a threshold value (e.g., 1), then that portion may be increased. The bucket may be replenished using a value provisioned from the main record or transferred from one or more other buckets. Alternatively, if the portion of the value in a particular bucket has dropped below a threshold value (e.g., 1), then that bucket may be reclaimed and eliminated from the set of buckets. If the portion of the value in the particular bucket is greater than zero, then the portion of the value may be moved from the particular bucket to the main record or to one or more other buckets. Similarly, when a new bucket is added (e.g., due to observed contention on the record and its buckets), a portion of the numerical value in the new bucket may be provisioned from the main record or transferred from one or more other buckets.

The buckets may be created and maintained in the data store using similar techniques as those used to create and maintain records. If the main record is associated with a primary key in the data store (where the primary key uniquely identifies the record within a relevant context), then the buckets may be assigned identifiers that are derived from or otherwise based (at least in part) on the primary key. For example, a bucket associated with a record may be assigned a key that includes the primary key for the record plus a seed value or another additional value specific to that bucket, where the resulting key uniquely identifies the bucket within a relevant context in the data store and also represents the association between the bucket and the main record.

As shown in 720, a request to update the record may be received. If the record represents a count of an item in an inventory, then the request may seek to increase or decrease the count (e.g., as a result of customer activity or merchant restocking). The request may include data or metadata (e.g., an item identifier) that is usable to identify the main record, and the request may also indicate the desired change to the contents of the record (e.g., an increase or decrease of a specified magnitude in a numerical value).

As shown in 730, one of the buckets associated with the record may be selected. The bucket may be selected on a random basis from among the set of buckets for the record. As used herein, the terms "random" and "randomly" also encompass pseudo-random techniques. The bucket may be selected for processing of the request and may be said to correspond to the request.

As shown in 740, an attempt may be performed to update the portion of the record in the selected bucket. An optimistic concurrency technique may be used to access the bucket such that a lock is not acquired when accessing the bucket, but a transaction is only committed if the value in the bucket has not been modified by another transaction since being read. Alternatively, a pessimistic concurrency technique may be used to access the bucket such that a lock is acquired and only one thread or process can attempt to update the bucket at any given time. As shown in 750, it may be determined whether the update attempt with the selected bucket was successful. Typically, the update will be successful if no other transaction has been committed on the selected bucket before the current update is committed. If the update attempt is successful, then the portion of the value in that bucket is increased or decreased instead of the value in the main record. If the update attempt is not successful (e.g., if the update failed due to contention on the bucket), then as shown in 760, it may be determined whether a maximum number of retries has been reached or some other suitable threshold condition has been met to terminate processing of the request. If so, then the method may end in failure. If not, then one or more retries may be attempted: as shown in 730, another bucket may be randomly selected for a retry of processing the update request. The bucket selected for a retry may be the same bucket or a different bucket than the one selected for the previous attempt. In one embodiment, any suitable number of retries may be attempted until the request is successfully processed. However, the use of buckets as described herein may reduce or mitigate the rate of contention and thus reduce or mitigate the rate of retries for updates. For example, if an additional request to update the numerical value is received before processing of the earlier request is completed, then often a different bucket may be randomly selected for processing of the additional request.

Illustrative Computer System

In at least some embodiments, a computer system that implements a portion or all of one or more of the technologies described herein may include a computer system that includes or is configured to access one or more computer-readable media. FIG. 8 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a record updating service, wherein the record updating service is configured to:
   divide a record containing a numerical value into a plurality of buckets, wherein the buckets contain portions of the numerical value whose summation is the numerical value;
   receive a request to increase or decrease the numerical value;
   determine a selected bucket of the plurality of buckets corresponding to the request, wherein the selected bucket is determined on a random basis; and
   increase or decrease a portion of the numerical value in the selected bucket based at least in part on the request, wherein access to the selected bucket is granted using optimistic concurrency.

2. The system as recited in claim 1, wherein the record updating service is further configured to:
   receive an additional request to increase or decrease the numerical value, wherein the additional request is received before processing of the request is completed;
   determine an additional selected bucket of the plurality of buckets corresponding to the additional request, wherein the additional selected bucket is determined on a random basis; and
   increase or decrease a portion of the numerical value in the additional selected bucket based at least in part on the additional request, wherein access to the additional selected bucket is granted using optimistic concurrency.

3. The system as recited in claim 1, wherein the record is divided into the plurality of buckets based at least in part on a detection of contention on the record.

4. A computer-implemented method, comprising:
performing, by one or more computing devices that implement a record updating service:
   dividing a record containing a numerical value into a plurality of buckets, wherein the buckets contain portions of the numerical value;

determining a selected bucket of the plurality of buckets corresponding to a request to update the numerical value, wherein the selected bucket is determined on a random basis; and updating a portion of the numerical value in the selected bucket based at least in part on the request.

5. The method as recited in claim 4, wherein access to the selected bucket is granted using an optimistic concurrency technique, and wherein the method further comprises:

receiving an additional request to update the numerical value, wherein the additional request is received before processing of the request is completed;

determining an additional selected bucket of the plurality of buckets corresponding to the additional request, wherein the additional selected bucket is determined on a random basis; and updating a portion of the numerical value in the additional selected bucket based at least in part on the additional request, wherein access to the additional selected bucket is granted using the optimistic concurrency technique.

6. The method as recited in claim 4, wherein the record is divided into the plurality of buckets based at least in part on a detection of contention on the record.

7. The method as recited in claim 4, further comprising:

determining that a portion of the numerical value in a particular bucket of the plurality of buckets has dropped below a threshold value; and increasing the portion of the numerical value in the particular bucket using a value provisioned from the record or transferred from one or more other buckets of the plurality of buckets.

8. The method as recited in claim 4, further comprising:

determining that a portion of the numerical value in a particular bucket of the plurality of buckets has dropped below a threshold value;

if the portion of the numerical value in the particular bucket is greater than zero, moving the portion of the numerical value from the particular bucket to the record or to one or more other buckets of the plurality of buckets; and eliminating the particular bucket.

9. The method as recited in claim 4, further comprising:

adding a new bucket to the plurality of buckets, wherein a portion of the numerical value in the new bucket is provisioned from the record or transferred from one or more other buckets of the plurality of buckets.

10. The method as recited in claim 4, further comprising:

determining an initial quantity of the plurality of buckets for the record based at least in part on a number of average concurrent requests for a plurality of other records.

11. The method as recited in claim 4, further comprising:

modifying a quantity of the plurality of buckets for the record based at least in part on an observed rate of contention on the plurality of buckets.

12. The method as recited in claim 4, further comprising:

receiving an additional request to update the numerical value, wherein the additional request is received before processing of the request is completed;

determining the selected bucket of the plurality of buckets corresponding to the additional request, wherein the selected bucket is determined on a random basis;

failing to process the additional request using the selected bucket due to contention on the selected bucket;

determining an additional selected bucket of the plurality of buckets corresponding to the additional request, wherein the additional selected bucket is determined on a random basis; and updating a portion of the numerical value in the additional selected bucket based at least in part on the additional request, wherein access to the additional selected bucket is granted using optimistic concurrency.

13. The method as recited in claim 4, further comprising:

assigning an identifier to a particular one of the buckets, wherein the identifier is based at least in part on a primary key for the record plus an additional value specific to the particular one of the buckets.

14. The method as recited in claim 4, wherein access to the selected bucket is granted using a lock according to a pessimistic concurrency technique, and wherein the method further comprises:

receiving an additional request to update the numerical value, wherein the additional request is received before processing of the request is completed;

determining an additional selected bucket of the plurality of buckets corresponding to the additional request, wherein the additional selected bucket is determined on a random basis; and updating a portion of the numerical value in the additional selected bucket based at least in part on the additional request, wherein access to the additional selected bucket is granted using a lock according to the pessimistic concurrency technique.

15. A computer-readable storage medium storing program instructions computer-executable to perform:

dividing a record into a plurality of sub-records, wherein the sub-records contain portions of the record;

determining a selected sub-record of the plurality of sub-records corresponding to a request to update the record; and updating the portion of the record in the selected sub-record based at least in part on the request, wherein access to the selected sub-record is granted using optimistic concurrency.

16. The computer-readable storage medium as recited in claim 15, wherein the program instructions are further computer-executable to perform:

receiving an additional request to update the record, wherein the additional request is received before processing of the request is completed;

determining an additional selected sub-record of the plurality of sub-records corresponding to the additional request, wherein the additional selected sub-record is determined on a random basis; and updating a portion of the record in the additional selected sub-record based at least in part on the additional request, wherein access to the additional selected sub-record is granted using optimistic concurrency.

17. The computer-readable storage medium as recited in claim 15, wherein the record is divided into the plurality of sub-records based at least in part on a detection of contention on the record.

18. The computer-readable storage medium as recited in claim 15, wherein the program instructions are further computer-executable to perform:

determining that a portion of the record in a particular sub-record of the plurality of sub-records has dropped below a threshold size; and increasing the portion of the record in the particular sub-record using one or more elements provisioned from the record or transferred from one or more other sub-records of the plurality of sub-records.

19. The computer-readable storage medium as recited in claim 15, wherein the program instructions are further computer-executable to perform:

determining that a portion of the record in a particular sub-record of the plurality of sub-records has dropped below a threshold size;

if the portion of the record in the particular sub-record is greater than zero, moving the portion of the record from the particular sub-record to the record or to one or more other sub-records of the plurality of sub-records; and eliminating the particular sub-record.

20. The computer-readable storage medium as recited in claim 15, wherein the program instructions are further computer-executable to perform:

modifying a quantity of the plurality of sub-records for the record based at least in part on an observed rate of contention on the plurality of sub-records.

\* \* \* \* \*